United States Patent
Gebhardt et al.

(10) Patent No.: US 11,802,799 B2
(45) Date of Patent: Oct. 31, 2023

(54) TEMPERATURE MEASURING DEVICE AND METHOD FOR DETERMINING TEMPERATURE

(71) Applicant: ABB Schweiz AG, Baden (CH)

(72) Inventors: Joerg Gebhardt, Mainz (DE); Peter Ude, Hanau (DE); Wilhelm Daake, Petershagen (DE); Stefan Tabelander, Herford (DE); Thilo Merlin, Linsengericht (DE)

(73) Assignee: ABB Schweiz AG, Baden (CH)

( * ) Notice: Subject to any disclaimer, the term of this patent is extended or adjusted under 35 U.S.C. 154(b) by 347 days.

(21) Appl. No.: 17/175,709

(22) Filed: Feb. 15, 2021

(65) Prior Publication Data

US 2021/0181032 A1   Jun. 17, 2021

Related U.S. Application Data

(63) Continuation of application No. PCT/EP2019/069574, filed on Jul. 19, 2019.

(51) Int. Cl.
  *G01K 1/143*  (2021.01)
  *G01K 1/08*   (2021.01)
  *G01K 7/02*   (2021.01)
  *G01K 7/16*   (2006.01)
  *G01K 13/02*  (2021.01)

(52) U.S. Cl.
  CPC .............. *G01K 1/143* (2013.01); *G01K 1/08* (2013.01); *G01K 7/02* (2013.01); *G01K 7/16* (2013.01); *G01K 13/02* (2013.01)

(58) Field of Classification Search
  CPC ............ G01K 1/143; G01K 1/08; G01K 7/02; G01K 7/16
  USPC ........................................ 374/208, 147, 163
  See application file for complete search history.

(56) References Cited

U.S. PATENT DOCUMENTS

| | | |
|---|---|---|
| 5,879,082 A | 3/1999 | Smitherman et al. |
| 6,220,750 B1 | 4/2001 | Palti |
| 9,360,377 B2 | 6/2016 | Converse |

(Continued)

FOREIGN PATENT DOCUMENTS

| | | |
|---|---|---|
| CN | 101548164 A | 9/2009 |
| CN | 103472088 A | 12/2013 |

(Continued)

*Primary Examiner* — Mirellys Jagan
(74) *Attorney, Agent, or Firm* — Leydig, Voit & Mayer, Ltd.

(57) ABSTRACT

A temperature measuring device for determining a temperature of a medium via a temperature of a measuring point on a surface surrounding the medium includes: at least one measuring sensor; at least one reference sensor; and a measurement value processing means, which is connected via a first supply line to the at least one measuring sensor and via a second supply line to the at least one reference sensor. The first and second supply lines each are mineral-insulated sheathed lines with an outer sheath of metal, the outer sheath enclosing at least two inner conductors which are insulated from the outer sheath with highly compressed metal oxide powder. The at least one measuring sensor is connected to the at least two inner conductors of the first supply line and the at least one reference sensor is connected to the at least two inner conductors of the second supply line.

7 Claims, 2 Drawing Sheets

(56) References Cited

U.S. PATENT DOCUMENTS

| | | |
|---|---|---|
| 2007/0206655 A1 | 9/2007 | Haslett et al. |
| 2010/0158073 A1 | 6/2010 | Marks |
| 2015/0185085 A1 | 7/2015 | Converse |
| 2016/0178446 A1 | 6/2016 | Ude |
| 2016/0258823 A1 | 9/2016 | Shimizu et al. |
| 2017/0328781 A1 | 11/2017 | Litteaur et al. |
| 2020/0103287 A1* | 4/2020 | Rud .................. G01K 1/14 |
| 2023/0030690 A1* | 2/2023 | Gebhardt .............. G01K 7/427 |

FOREIGN PATENT DOCUMENTS

| | | | | |
|---|---|---|---|---|
| CN | 104048771 A | | 9/2014 | |
| CN | 105115617 A | | 12/2015 | |
| CN | 206281586 U | * | 6/2017 | ............ G01K 1/16 |
| DE | 1573271 A1 | | 6/1970 | |
| DE | 87677 A1 | | 2/1972 | |
| DE | 2327557 A1 | | 12/1974 | |
| DE | 3878304 T2 | | 5/1993 | |
| DE | 19800753 A1 | | 7/1999 | |
| DE | 29918228 U1 | | 1/2000 | |
| DE | 102004034186 B3 | | 8/2005 | |
| DE | 102008064360 B3 | | 8/2010 | |
| DE | 102011008176 A1 | | 7/2012 | |
| DE | 102011086974 A1 | | 5/2013 | |
| DE | 102014019365 A1 | | 6/2016 | |
| DE | 102017120684 A1 | * | 3/2019 | |
| DE | 102021117715 A1 | * | 1/2023 | |
| EP | 0404310 A2 | * | 12/1990 | |
| EP | 3087304 | | 11/2016 | |
| GB | 1119338 A | | 7/1968 | |
| JP | 2007-212407 A | | 8/2007 | |
| SU | 520518 A1 | | 7/1976 | |
| WO | WO 2014164251 A1 | | 10/2014 | |
| WO | WO-2015099933 A1 | * | 7/2015 | ............ G01K 1/143 |
| WO | WO 2015/137075 A1 | | 9/2015 | |

* cited by examiner

TEMPERATURE MEASURING DEVICE AND METHOD FOR DETERMINING TEMPERATURE

CROSS-REFERENCE TO PRIOR APPLICATION

This application is a continuation of International Patent Application No. PCT/EP2019/069574, filed on Jul. 19, 2019, which claims priority to German Patent Application No. DE 10 2018 119 857.4, filed on Aug. 15, 2018. The entire disclosure of both applications is hereby incorporated by reference herein.

FIELD

The invention concerns a temperature measuring device for determining a temperature of a medium via the temperature of a surface enclosing the medium, comprising at least one measuring sensor and at least one reference sensor. The invention also concerns a method for determining the temperature of a medium.

BACKGROUND

In the measurement technology of industrial processes, temperature measuring devices are known in which one or more temperature sensors are mounted in a thermowell which protrudes at least partially into the interior of the pipeline or a vessel. For this purpose, an opening must be provided in the pipe or the vessel with an associated seal for the temperature measuring device.

These invasive measuring arrangements have the disadvantage that components protrude into the process space and this can lead to flow energy losses, abrasion, breakage, obstruction of cleaning processes and potential leakages. In addition, explosion protection must optionally be considered for each pipe and container opening.

The field of application of the invention extends to temperature measuring devices in which a surface temperature sensor rests on a surface in order to determine the temperature of a medium underneath or behind it. Ideally, such a sensor should assume the temperature of the medium, which is enclosed by the surface. If, for example, the temperature sensor is designed as an electrical thermocouple, the temperature of the sensor and thus the temperature of the medium can be inferred by measuring the thermoelectric voltage, provided that both are in thermal equilibrium, i.e. have the same temperature.

DE 198 00 753 A1 describes a non-invasive temperature measuring device with a measuring sensor and a reference sensor, in which the measuring sensor is connected to the measuring point, the reference sensor is kept at ambient temperature and the measuring sensor and the reference sensor are spaced apart by a thermal insulation material.

A disadvantage of this procedure, known from the generally known state of the art, is that the surface temperature sensor interacts thermally not only with the surface but also with its environment, for example the surrounding air. In practice, the surface temperature sensor therefore measures neither the temperature of the medium nor of the surface, but a mixing temperature that lies between the temperature of the medium and the ambient temperature. Usually the reference temperature sensor is mounted far away from the process, generally in the transmitter head.

It should be noted that changes in ambient temperature, which also affect the mechanical connection between sensor and transmitter head, can significantly reduce the accuracy of measurement. Therefore, they are often provided with thermal insulation, the actual effect of which is usually not known in the application.

Even when the process temperature changes, a reference temperature sensor far away from the process only reaches its new thermal equilibrium value extremely slowly. For a compensation algorithm, this often means a delay behavior over several minutes.

From DE 87 677 B1 a temperature measuring device for the determination of the temperature of liquid and viscous masses is known, which comprises beside a sensor in the tip of a rod-shaped temperature sensor immersed in the medium a second sensor in the shaft of the sensor. The device has a computing unit with an electronically stored approximation formula for calculating an approximation of the temperature a medium, wherein the approximation formula is stored as the sum of the mixing temperature and a product of two factors, one factor being the difference between the mixing temperature and the ambient temperature and the second factor representing a calibration factor.

US 2007/0206655 A1 describes a device and method for determining human body temperature, whereby the device is arranged on the body surface. The technical theory taught is based on the assumption that the physical properties of the object to be measured—in particular the heat transfer resistance of the skin—are sufficiently well known within a certain tolerance. Furthermore, the correct placement of the device at a given measuring point is assumed. Uncertainties in placement and heat transfer resistance are countered with a one- or two-dimensional sensor array at least for determining the surface temperature. In addition, the technical teaching provided provides for a thermally insulating intermediate layer between the measuring points for the surface temperature and the ambient temperature, the properties of which—in particular their heat transfer resistance—are sufficiently known because the layer thickness and the material used are known. Against the background of known physical properties, the technical teaching provides for the determination of the body temperature from the local surface temperature and the ambient temperature by means of known heat transfer resistances. Apart from the unsuitability of the disclosed materials in the industrial field, especially in the high temperature range >400° C., the determining heat transfer resistances are regularly completely unknown in the field of industrial temperature measurement technology.

In addition, the German utility model DE 299 18 228 U1 discloses a temperature measuring element with a number of temperature sensors arranged at different distances from the measuring point.

U.S. Pat. No. 6,220,750 B1 describes a non-invasive temperature measuring device in which two temperature sensors are accommodated at different distances from the measuring point in a housing which is sealed off from the environment, whereby the housing also comprises a heating device which is operated to compensate for the temperature difference between the two temperature sensors.

Finally, WO 2014/164251A1 describes a temperature measuring device with two temperature sensors, which are mounted in a common housing on a common carrier at a distance from the measuring point, whereby one of the temperature sensors is thermally connected to the measuring point via a thermally conductive element.

SUMMARY

In an embodiment, the present invention provides a temperature measuring device for determining a temperature of a medium via a temperature of a measuring point on a surface surrounding the medium, comprising: at least one measuring sensor; at least one reference sensor; and a measurement value processing means, which is connected via a first supply line to the at least one measuring sensor and via a second supply line to the at least one reference sensor, wherein the first and second supply lines each comprise mineral-insulated sheathed lines with an outer sheath of metal, the outer sheath enclosing at least two inner conductors which are insulated from the outer sheath with highly compressed metal oxide powder, wherein the at least one measuring sensor is connected to the at least two inner conductors of the first supply line and the at least one reference sensor is connected to the at least two inner conductors of the second supply line, wherein the outer sheathing of the first supply line is connected to the outer sheathing of the second supply line close to the measuring point on the surface surrounding the medium by at least one coupling element, wherein the at least one measuring sensor and the at least one reference sensor are arranged between the surface enclosing the medium and the at least one coupling element, and wherein a thermal resistance between the at least one measuring sensor and the at least one coupling element is greater than a thermal resistance between the at least one reference sensor and the at least one coupling element.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
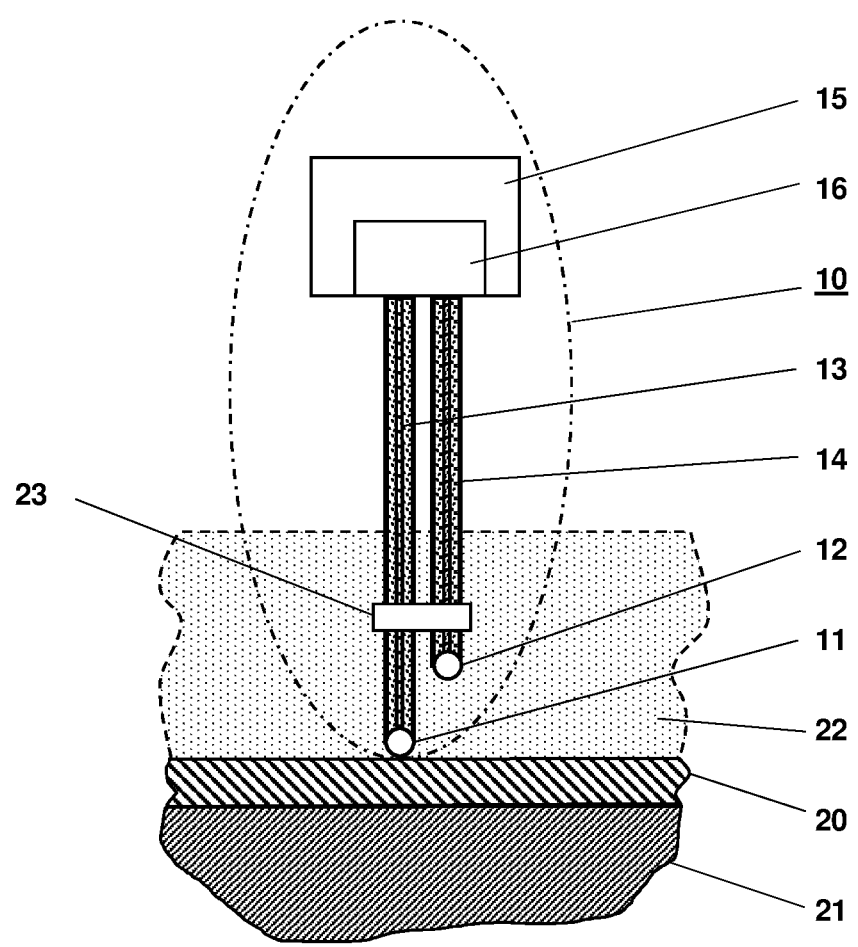
FIG. 1 illustrates the principle of a temperature measuring device with mineral-insulated sheathed lines.

In an embodiment, the present invention provides a temperature measuring device for the non-invasive measurement of a temperature of a medium via a housing wall surrounding the medium under reproducible thermal conditions at the measuring point whose dynamic measuring accuracy is improved.

The invention starts from at least one temperature measuring device for determining a temperature of a medium via the temperature of a surface surrounding the medium, comprising at least one measuring sensor resting on the surface and at least one reference sensor thermally spaced apart from the medium, wherein the at least one measuring sensor is connected via a first supply line and the at least one reference sensor is connected via a second supply line to a common measurement value processing means which has the ambient temperature.

In accordance with the invention, the first and second supply lines are each designed as mineral-insulated sheathed lines with an outer sheath of metal, the outer sheath enclosing at least two inner conductors which are insulated against the outer sheath with highly compressed metal oxide powder. The at least one measuring sensor is connected to the inner conductors of the first supply line and the at least one reference sensor is connected to the inner conductors of the second supply line. To protect the measuring sensor or the reference sensor, the sensor-bearing end of the respective sheathed line is equipped with a metal cap enclosing the respective sensor, which is tightly connected to the outer sheath of the respective sheathed line. In the context of this disclosure, this metal cap is added to the outer sheath of the respective sheathed line.

The outer sheathing of the first supply line is connected to the outer sheathing of the second supply line close to the measuring point on the surface surrounding the medium by at least one coupling element.

The at least one measuring sensor and the at least one reference sensor are arranged between the surface enclosing the medium and the coupling element in such a way that the thermal resistance between the at least one measuring sensor and the coupling element is greater than the thermal resistance between the at least one reference sensor and the coupling element.

Advantageously, as the result of the design of the temperature measuring device according to the invention in the area between the coupling element and the surface enclosing the medium there are reproducible thermal conditions at the measuring point independent of the length of the sheathed lines and thus independent of the distance of the ambient temperature from the measuring point.

In addition, the proximity of at least one reference sensor to at least one measuring sensor achieves a high dynamic measuring accuracy.

In detail, the at least one measuring sensor and the at least one reference sensor are thermally connected at different distances to the same thermally conductive coupling element which is arranged between the at least one measuring sensor and the common measurement value processing means.

In other words, the at least one measuring sensor and the at least one reference sensor are arranged on the same thermal path between the medium and the common measurement processing means. While the known state of the art teaches the skilled person to keep at least one reference sensor as close as possible to the ambient temperature or at least close to the ambient temperature, it has turned out in a surprising manner that this structurally complex arrangement is not only unnecessary but also leads to a poor response behavior of the temperature measuring device. Rather, it is sufficient to tap the thermal path between the process temperature of the medium to be determined and the ambient temperature of the common measurement value processing means of a type of a voltage divider at whose tap the at least one reference sensor is arranged.

This is achieved by the at least one measuring sensor and the at least one reference sensor being arranged between the surface enclosing the medium and the coupling element such that the thermal resistance between the at least one measuring sensor and the coupling element is greater than the thermal resistance between the at least one reference sensor and the coupling element.

Since the measuring sensor and the at least one reference sensor are thermally connected to the same thermally conductive element, temperature changes both in the process temperature of the medium and in the ambient temperature simultaneously affect both sensors in different quantities. This improves the response behavior to any temperature changes, regardless of any thermal insulation of the container.

In a particularly advantageous embodiment of the invention, both the at least one measuring sensor and the at least one reference sensor are formed as standard measuring plugs for industrial temperature measurement, so-called insets.

For high temperature measurements in particular, these measuring plugs consist of a mineral-insulated sheathed line which is equipped with a temperature-sensitive element at one end or whose internal conductors connected on one side already form a thermocouple. Such measuring plugs have the robustness and temperature resistance required in industrial environments, especially above 200° C., where standard lines and insulation materials cannot be used.

In addition, the arrangement in accordance with the invention leads to a compact design of the temperature measuring device, since both the at least one measuring sensor and the at least one reference sensor are arranged on the same path between the measuring point on the vessel and the measurement value processing means.

In detail, the at least one measuring sensor is connected to the measuring point on the vessel via a good heat conducting connection, for example with a thermal resistance R3. Compared to the coupling element, the at least one measuring sensor is coupled with a thermal resistance R1.

The at least one reference sensor is located at a distance from the measuring point on the vessel on the main thermal connection path between the measuring point on the vessel and the coupling element close to the measuring point. The environmental influences acting on at least one measuring sensor are largely completely recorded. In detail, there is a thermal resistance R2 to the coupling element and a thermal resistance R4 to the measuring point between the at least one reference sensor and the coupling element.

In such a measuring arrangement, the heat conduction from the measuring point via the coupling element to the outside—the environment in the sense of a thermal reservoir—or vice versa to the inside—in cold processes—can be described in good approximation by a linear sequence of thermal resistances along this path. Lateral heat flow leaks or inflows occur only to a small extent.

The reference sensor is placed between the coupling element and the measuring sensor. The respective reference sensor has a well-defined thermal resistance R4 to the measuring point and a well-defined thermal resistance R2 to the coupling element. In the case of standard thermometer insets, these thermal resistances are approximately proportional to the length of the inset between the respective temperature measuring points.

In summary, the difference between the present invention and the known state of the art is that the at least one reference sensor is no longer installed far from the process as before but in such a way that R1>R2 applies in relation to an internal reference point which is formed by the coupling element and is largely independent of the ambient temperature.

Due to the selected arrangement, there are only minor deviations from the actual temperature of the surface with and without insulation of the container, both at constant and variable surface temperatures. The case without insulation is often tolerable because the sensor arrangement can advantageously be surrounded by a supporting structure made of moderately heat-conducting metal, such as stainless steel. Such a holding construction can consist of a metal tube adapter, which is fastened to the tube with metal straps, for example, and additionally also of a so-called "neck tube". The sensor arrangement with the heat path essential for the measuring principle can then generally be separated from the neck tube and the tube adapter by an air layer, for example. This has an advantageous effect on the dominance of the main thermal path along the sensors, as the air layers are already highly thermally insulating.

As a result, quasi-static temperature compensation is then sufficient to calculate the surface temperature even with rapid changes in the latter. The formation of time derivatives of the measurement signals, which can generally cause great problems because they amplify the measurement noise, are advantageously dispensable.

The calculation of the surface temperature from the measurement signals of the measuring sensor and the reference sensor is carried out using methods known for themselves, such as those described in DE 10 2014 019 365.

A temperature measuring device in which the reference sensor is at least thermally closer to the measuring sensor than to the measurement value processing means has proven to be particularly advantageous. This is achieved by the coupling element, which encloses at least one measuring sensor and at least one reference sensor between the coupling element and the measuring point close to the measuring point. Thus, for all thermally conductive connections between the measuring sensor and the measurement value processing means whose thermal resistances are approximately proportional to the length—including, but not limited to, the mineral-insulated sheathed lines mentioned above—the geometric distance of the reference sensor to the measuring sensor is smaller than the geometric distance of the reference sensor to the measurement value processing means.

Surprisingly, it turned out to be particularly advantageous if the ratio of thermal resistances R1/R2>10. Thus, for all thermally conductive connections between the measuring sensor and the measurement value processing means whose thermal resistances are approximately proportional to the length—in particular but not limited to the mineral-insulated sheathed lines mentioned above—the geometric distance between the reference sensor and the measuring sensor is much smaller than the geometric distance between the reference sensor and the measurement value processing means.

Even with a ratio of the thermal resistances R1/R2>50, the above-mentioned advantages of the temperature measuring device according to the invention occur. The reference sensor is geometrically only slightly spaced apart from the measuring sensor. Advantageously, such an arrangement favors miniaturization as well as compact designs of the temperature measuring device. A particular advantage is that the measuring sensor and the reference sensor are housed in the same housing.

According to another feature of the invention, the thermal resistance R3 between the measuring sensor and the measuring point on the surface surrounding the medium is smaller than the thermal resistance R4 between the reference sensor and the measuring point on the surface surrounding the medium.

Surprisingly, it has proven to be particularly advantageous when the ratio of R4/R3 thermal resistances is <10. Thus, for all thermally conductive connections between the measuring sensor and the coupling element whose thermal resistances are approximately proportional to the length—in particular but not limited to the mineral-insulated sheathed lines mentioned above—the geometric distance of the reference sensor to the measuring sensor is much smaller than the geometric distance of the reference sensor to the coupling element.

Even with a ratio of the thermal resistances R4/R3<50, the above mentioned advantages of the temperature measuring device according to the invention occur. The reference sensor is geometrically only slightly spaced apart from the measuring sensor. Advantageously, such an arrangement favors miniaturization as well as compact designs of the temperature measuring device. A particular advantage is that the measuring sensor and the reference sensor are housed in the same housing.

According to another feature of the invention, the ratio of the thermal resistance R1 between the measuring sensor and the coupling element and the thermal resistance R3 between the measuring sensor and the measuring point on the surface surrounding the medium is greater than the ratio of the thermal resistance R2 between the reference sensor and the coupling element and the thermal resistance R4 between the reference sensor and the measuring point on the surface surrounding the medium R1/R3>R2/R4.

After a further feature of the invention, at least one further reference sensor is arranged on the main thermal connection path between the measuring point at the vessel and the environment. With each additional reference temperature, the accuracy of the temperature measuring device is improved. In addition, additional reference temperatures also allow diagnoses to be made as to whether the insulation is sufficient, the mounting or ambient conditions meet the requirements or how one-dimensional the thermal path is.

According to a further feature of the invention, different sensor element types, such as resistance thermometers (NTC thermistors or PTC thermistors), thermocouples, for the measuring sensor and the reference sensor in any mixture in the same temperature measuring device are permissible.

According to another feature of the invention, the angle of the temperature measuring device to the measuring surface can be selected freely. The measuring arrangement can be arranged vertically, parallel or at any other angle to the measuring surface. Advantageously, measuring points at measuring points that are difficult to access can also be operated.

The invention is explained in more detail below using examples. The respective drawings show:

FIG. 1 shows a temperature measuring device 10 with its invention-essential components on a sectional view of container wall 20. The temperature measuring device 10 essentially consists of a head housing 15 in which measuring value processing means 16 are accommodated. A measuring sensor 11 is connected via a supply line 13 to the measurement value processing means 16 in the head housing 15. In addition, a reference sensor 12 is connected via a separate supply line 14 to the measurement value processing means 16 in the head housing 15.

Furthermore, a measuring point is shown for determining the temperature of a medium 21 which is enclosed in a container. For this purpose, a representative section of a vessel wall 20 of the vessel is shown at the measuring point.

The temperature measuring device 10 is located outside the vessel—in the drawing plane above the vessel wall 20—at the measuring point and the medium 21 is enclosed inside the vessel—in the drawing plane below the vessel wall 20.

The container may have on the outer surface of the container wall 20 a thermal insulation layer 22 which at least reduces a heat flow between the outer surface of the container wall 20 and the environment.

To determine the temperature of a medium, the temperature measuring device 10 is arranged at the measuring point in such a way that the measuring sensor 11 is located close to the surface of the vessel wall 20 enclosing the medium 21.

The supply line 13 to the measuring sensor 11 is designed as a known mineral-insulated sheathed line with an outer sheath of metal, whereby the outer sheath encloses at least two inner conductors which are insulated against the outer sheath with highly compressed metal oxide powder. The thermal resistance of such a mineral-insulated sheathed line is approximately proportional to its length due to its design.

In this embodiment, the measuring sensor 11 is advantageously designed as a thermocouple whose measuring tip is brought into contact with the vessel wall 20. In particular, it may be provided to equip the measuring tip with a silver inlay or to form a silver tip. Advantageously, the thermal resistance R3 is reduced to a minimum.

The supply line 14 to the reference sensor 12 is designed as a known mineral-insulated sheathed line with an outer sheath of metal, whereby the outer sheath encloses at least two inner conductors which are insulated against the outer sheath with highly compressed metal oxide powder. The thermal resistance of such a mineral-insulated sheathed line is approximately proportional to its length due to its design.

The supply line 14 to the reference sensor 12 is thermally connected to the supply line 13 to the measuring sensor 11 close to the measuring point with a coupling element 23. In the preferred embodiment of the invention, it is intended that the coupling element 23 encloses the outer sheaths of the sheathed lines of the supply lines 13 and 14. In the simplest form of the invention, it is sufficient for coupling element 23 to touch the outer sheaths of the sheathed lines of supply lines 13 and 14.

In the preferred design of the invention, the coupling element 23 is made of metal. In addition, ceramics or plastics are generally also suitable as coupling elements.

Thus both the measuring sensor 11 and the reference sensor 12 are connected to the coupling element 23 via known thermal resistances.

The geometric distance of the reference sensor 12 from the measuring sensor 11 is smaller than the geometric distance of the reference sensor 12 from the measurement value processing means 16 in the head housing 15. Preferably, the reference sensor 12 is arranged close to the coupling element 23. Due to the proportionality of the thermal resistance of the mineral-insulated sheathed line of the supply line 13 to the measuring sensor 11, the ratio of the thermal resistances R1/R2>1 is in any case the most advantageous. All ratios of the thermal resistances R1/R2>10 are particularly advantageous. The reference sensor 12 is located in the immediate vicinity of the measuring sensor 11.

Figure 2:
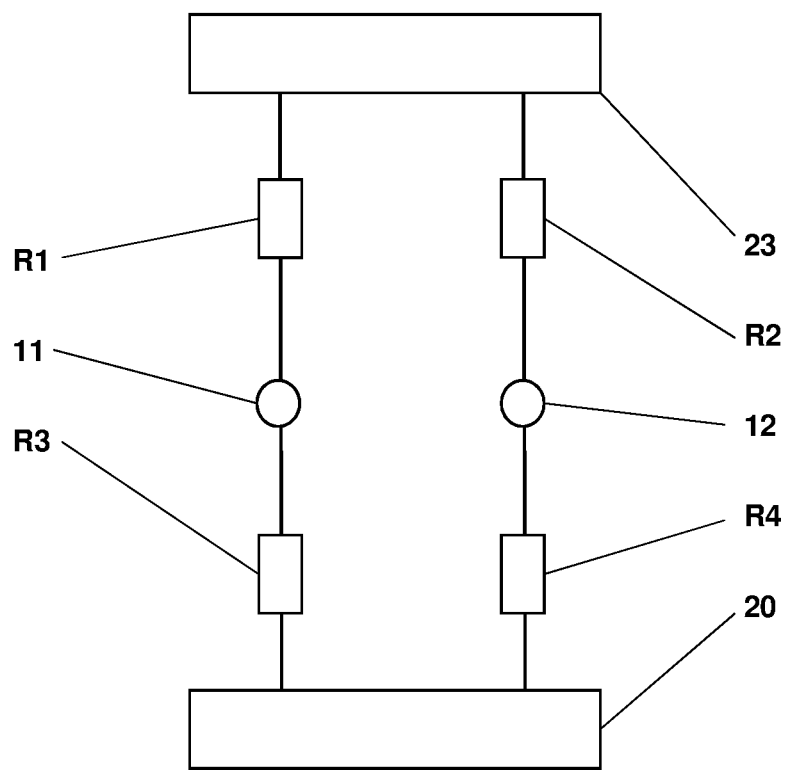
FIG. 2 is a principle diagram of the thermal conditions of a temperature measuring device with a coupling element

FIG. 2 shows a principle diagram of the thermal conditions of a temperature measuring device 10 with a coupling element 23 using the same reference symbols for the same means. In detail, the measuring sensor 11 and the reference sensor 12 are arranged between the container wall 20 and the coupling element 23.

The measuring sensor 11 has a thermal resistance R1 to the coupling element 23 and a thermal resistance R3 to the measuring point on the vessel wall 20.

The reference sensor 12 has a thermal resistance R2 to the coupling element 23 and a thermal resistance R4 to the measuring point on the vessel wall 20.

At least the thermal resistance R1 between the at least one measuring sensor 11 and the coupling element 23 is greater than the thermal resistance R2 between the at least one reference sensor 12 and the coupling element 23, i.e. R1/R2>1.

It is advantageous that the thermal resistance R4 between the at least one reference sensor 12 and the measuring point on the vessel wall 20 is greater than the thermal resistance R3 between the at least one measuring sensor 11 and the measuring point on the vessel wall 20, i.e. R4/R3<1.

Particularly advantageous is the ratio of the thermal resistance R1 between the measuring sensor 11 and the coupling element 23 and the thermal resistance R3 between the measuring sensor 11 and the measuring point on the surface enclosing the medium greater than the ratio of the thermal resistance R2 between the reference sensor 12 and the coupling element 23 and the thermal resistance R4 between the reference sensor 12 and the measuring point on the surface enclosing the medium R1/R3>R2/R4.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

10 Temperature measuring device
11 Measuring sensor
12 Reference sensor
13 Supply line to the measuring sensor
14 Supply line to reference sensor
15 Head housing
16 Measuring value processing means
20 Container wall
21 Medium
22 Insulation layer
23 Coupling element
R1, R2, R3, R4 Thermal resistance

What is claimed is:

1. A temperature measuring device for determining a temperature of a medium via a temperature of a measuring point on a surface surrounding the medium, comprising:
   at least one measuring sensor;
   at least one reference sensor; and
   a measurement value processing means, which is connected via a first supply line to the at least one measuring sensor and via a second supply line to the at least one reference sensor,
   wherein the first and second supply lines each comprise mineral-insulated sheathed lines with an outer sheath of metal, the outer sheath enclosing at least two inner conductors which are insulated from the outer sheath with highly compressed metal oxide powder,
   wherein the at least one measuring sensor is connected to the at least two inner conductors of the first supply line and the at least one reference sensor is connected to the at least two inner conductors of the second supply line,
   wherein the outer sheath of the first supply line is connected to the outer sheath of the second supply line close to the measuring point on the surface surrounding the medium by at least one coupling element,
   wherein the at least one measuring sensor and the at least one reference sensor are arranged between the surface enclosing the medium and the at least one coupling element, and
   wherein a thermal resistance between the at least one measuring sensor and the at least one coupling element is greater than a thermal resistance between the at least one reference sensor and the at least one coupling element.

2. The temperature measuring device according to claim 1, wherein a ratio of the thermal resistance between the at least one measuring sensor and the at least one coupling element and the thermal resistance between the at least one reference sensor and the at least one coupling element is >10.

3. The temperature measuring device according to claim 1, wherein a ratio of the thermal resistance between the at least one measuring sensor and the at least one coupling element and the thermal resistance between the at least one reference sensor and the at least one coupling element is >50.

4. The temperature measuring device according to claim 1, wherein a ratio of the thermal resistance between the at least one measuring sensor and the at least one coupling element and a thermal resistance between the at least one measuring sensor and the measuring point on the surface enclosing the medium is greater than a ratio of the thermal resistance between the at least one reference sensor and the at least one coupling element and a thermal resistance between the at least one reference sensor and the measuring point on the surface enclosing the medium.

5. The temperature measuring device according to claim 1, wherein a thermal resistance between the at least one measuring sensor and the measuring point on the surface surrounding the medium is smaller than a thermal resistance between the at least one reference sensor and the measuring point on the surface surrounding the medium.

6. The temperature measuring device according to claim 5, wherein a ratio of the thermal resistance between the at least one reference sensor and the measuring point on the surface surrounding the medium and the thermal resistance between the at least one measuring sensor and the measuring point on the surface surrounding the medium is <10.

7. The temperature measuring device according to claim 5, wherein a ratio of the thermal resistance between the at least one reference sensor and the measuring point on the surface surrounding the medium and the thermal resistance between the at least one measuring sensor and the measuring point on the surface surrounding the medium is <50.

* * * * *